US009578593B2

(12) United States Patent
McCann

(10) Patent No.: US 9,578,593 B2
(45) Date of Patent: Feb. 21, 2017

(54) SYSTEM AND METHOD FOR COORDINATED REMOTE CONTROL OF NETWORK RADIO NODES AND CORE NETWORK ELEMENTS

(71) Applicant: Futurewei Technologies, Inc., Plano, TX (US)

(72) Inventor: Peter J. McCann, Bridgewater, NJ (US)

(73) Assignee: Futurewei Technologies, Inc., Plano, TX (US)

(*) Notice: Subject to any disclaimer, the term of this patent is extended or adjusted under 35 U.S.C. 154(b) by 69 days.

(21) Appl. No.: 14/302,106

(22) Filed: Jun. 11, 2014

(65) Prior Publication Data
US 2014/0362790 A1 Dec. 11, 2014

Related U.S. Application Data

(60) Provisional application No. 61/833,650, filed on Jun. 11, 2013.

(51) Int. Cl.
*H04W 40/02* (2009.01)
*H04W 40/24* (2009.01)
*H04L 12/725* (2013.01)
*H04L 12/721* (2013.01)

(52) U.S. Cl.
CPC ......... *H04W 40/248* (2013.01); *H04L 45/302* (2013.01); *H04L 45/306* (2013.01); *H04L 45/308* (2013.01); *H04L 45/38* (2013.01); *H04W 40/246* (2013.01)

(58) Field of Classification Search
CPC .............. H04W 72/042; H04W 40/02; H04W 72/1278; H04W 24/00; H04W 72/0406; H04W 24/02; H04W 76/025; H04W 72/10; H04W 72/1242; H04W 12/04;
(Continued)

(56) References Cited

U.S. PATENT DOCUMENTS 8,762,501 B2 * 6/2014 Kempf et al. ................ 709/220
2004/0047322 A1 * 3/2004 O'Neill ........................ 370/338
2008/0310367 A1 12/2008 Meylan
(Continued)

OTHER PUBLICATIONS

Li et al., "Toward Software-Defined Cellular Networks", EWSDN, 2012, 2013 Second European Workshop on Software Defined Networks, 2013 Second European Workshop on Software Defined Networks 2012, pp. 7-12, pub. Oct. 26, 2012.*

(Continued)

*Primary Examiner* — Khaled Kassim
*Assistant Examiner* — Zhaohui Yang
(74) *Attorney, Agent, or Firm* — Slater Matsil, LLP

(57) ABSTRACT

An embodiment method of routing network traffic includes configuring flow tables of a virtual switch using an Open-Flow protocol. The virtual switch is disposed at a network radio node. The method includes receiving network traffic destined for a user equipment (UE) at the virtual switch and establishing, by a packet data convergence protocol (PDCP) layer, a data radio bearer (DRB) for the network traffic between a virtual port on the virtual switch and the UE. The method also includes routing the network traffic over the DRB from the virtual port, through the PDCP layer, and toward the UE according to the flow tables.

29 Claims, 16 Drawing Sheets

(58) Field of Classification Search
CPC ......... H04W 36/0033; H04W 72/1289; H04W 24/04; H04W 28/12
See application file for complete search history.

(56) References Cited

U.S. PATENT DOCUMENTS

| | | | |
|---|---|---|---|
| 2009/0238129 A1* | 9/2009 | Park et al. | 370/329 |
| 2011/0317642 A1* | 12/2011 | Eravelli et al. | 370/329 |
| 2012/0051229 A1* | 3/2012 | Feldmann et al. | 370/242 |
| 2012/0243462 A1 | 9/2012 | Bucknell et al. | |
| 2012/0300615 A1 | 11/2012 | Kempf et al. | |

OTHER PUBLICATIONS

Trademark registration for "OpenFlow", USPTO, published Jan. 8, 2013.*

OpenFlow archived webpage, http://archive.openflow.org/wp/learnmore/, published before Feb. 20, 2014.*

"Software-Defined Networking: The New Norm for Networks", OpenNetwork Foundation, White Paper Apr. 13, 2012.*

OpenFlow definition by Open Network Foundation, https://www.opennetworking.org/sdn-resources/openflow, retrieved May 3, 2016.*

International Search Report received in Application No. PCT/US14/41982 mailed Oct. 22, 2014, 6 pages.

McKeown, N., et al., "OpenFlow: Enabling Innovation in Campus Networks," ACM SIGCOMM Computer Communication Review, vol. 38, Issue 2, Mar. 14, 2008, pp. 69-74.

Arijit Banerjee et al., "MOCA: A Lightweight Mobile Cloud Offloading Architecture", Mobiarch '13, Oct. 4, 2013, Miami, Florida, 6 pages.

Venmani Daniel Philip et al., "Preliminary Analysis of 40-LTE Mobile Network Sharing for Improving Resiliency and Operator Differentiation", Communications in Computer and INformation Science, Springer, DE, vol. 171, No. Part5, Jan. 1, 2011, 23 pages.

Said et al., New Control Plane in 3GPP LTE/EPC Architecture for On-Demand Conectivity Service, Orange Labs, France, IEEE 2013, 5 pages.

Li et al., "CellSDN: Software-Defined Celluiar Networks", ftp://ftp.cs.princeton.edu/techreports/2012/922.pdf, Apr. 30, 2012, 6 pages.

* cited by examiner

SYSTEM AND METHOD FOR COORDINATED REMOTE CONTROL OF NETWORK RADIO NODES AND CORE NETWORK ELEMENTS

This application claims the benefit of U.S. Provisional Application No. 61/833,650, titled "Software Defined LTE," filed on Jun. 11, 2013, which application is hereby incorporated herein by reference.

TECHNICAL FIELD

The present invention relates generally to a software defined wireless network and, in particular embodiments, to a system and method for coordinated remote control of network radio nodes and core network elements.

BACKGROUND

Driven largely by smart phones, tablets, and video streaming, the amount of wireless data handled by wireless networks has risen markedly and is expected to continue to rise by orders of magnitude over the next ten years. In addition to the sheer volume of data, the number of devices is expected to continue to grow exponentially, possibly reaching into the billions of devices, along with radically higher data rates. Different applications will place different requirements on the performance of future wireless networks. Future wireless networks are expected to be highly flexible, highly efficient, open, and customizable for customers and consumers.

In a Long Term Evolution (LTE) wireless network, the eNodeB (eNB) is responsible for running the radio resource control (RRC) protocol and is in charge of many decisions such as commanding the user equipment (UE) to measure neighboring cells in a particular priority order and initiating handover to neighbors based on a policy. In today's products, this policy is often hard-coded with limited means of configuration, and is difficult to change.

3GPP LTE and Wi-Fi use centralized architectures where user sessions are managed in highly centralized data centers or central offices. Due to the proliferation of highly functional user equipment (UE) that allow users to multi-task, for example, surf the internet, instant message and stream videos at the same time, the handling of user sessions in the data centers or central office can approach the performance limits of the data centers or central office.

In addition, with the increased deployment of small cells, het-net, machine to machine (M2M), and networks of devices, where thousands or millions of devices are attached, there are a large number of user sessions, some of which are more local (i.e., originate and terminate in nearby locations), while others are more distant. Each of these devices may be mobile. A core network anchors the Internet protocol (IP) sessions centrally and thus is able to maintain an IP session while a device transitions between layer 2 anchor points. Furthermore, the core network architecture, which is based on tunnels to a fixed anchor point, is cumbersome and inefficient. The packet data network (PDN) gateway (PGW) becomes a bottleneck in terms of the number of sessions that can be managed, and it becomes a central point of failure because it maintains so much state about the mobile nodes (MNs).

SUMMARY

An embodiment method of routing network traffic includes configuring flow tables of a virtual switch using an OpenFlow protocol. The virtual switch is disposed at a network radio node. The method includes receiving network traffic destined for a user equipment (UE) at the virtual switch and establishing, by a packet data convergence protocol (PDCP) layer, a data radio bearer (DRB) for the network traffic between a virtual port on the virtual switch and the UE. The method also includes routing the network traffic over the DRB from the virtual port, through the PDCP layer, and toward the UE according to the flow tables.

An embodiment network radio node includes an Open-Flow switch and a PDCP module. The OpenFlow switch is configured to receive network traffic destined for a UE from a router. The OpenFlow switch includes a secure channel over which a flow-entry and an associated action are received according to an OpenFlow protocol. The Open-Flow switch also includes flow tables configured to store the flow-entry. The PDCP module is configured to receive an initialization instruction and establish a DRB between a virtual port on the OpenFlow switch and the UE according to the initialization instruction. The OpenFlow switch is further configured to route the network traffic over the DRB according to the flow-entry and the associated action.

An embodiment communication system includes a central software defined network (SDN) controller, a network radio node, and a plurality of routers. The central SDN controller includes a radio resource control (RRC) module. The network radio node is configurable by the RRC module according to a routing policy. The network radio node is configured to serve a UE. The plurality of routers are configurable by the central SDN controller according to an OpenFlow protocol and the routing policy. The plurality of routers are configured to route network traffic destined for the UE to the network radio node.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
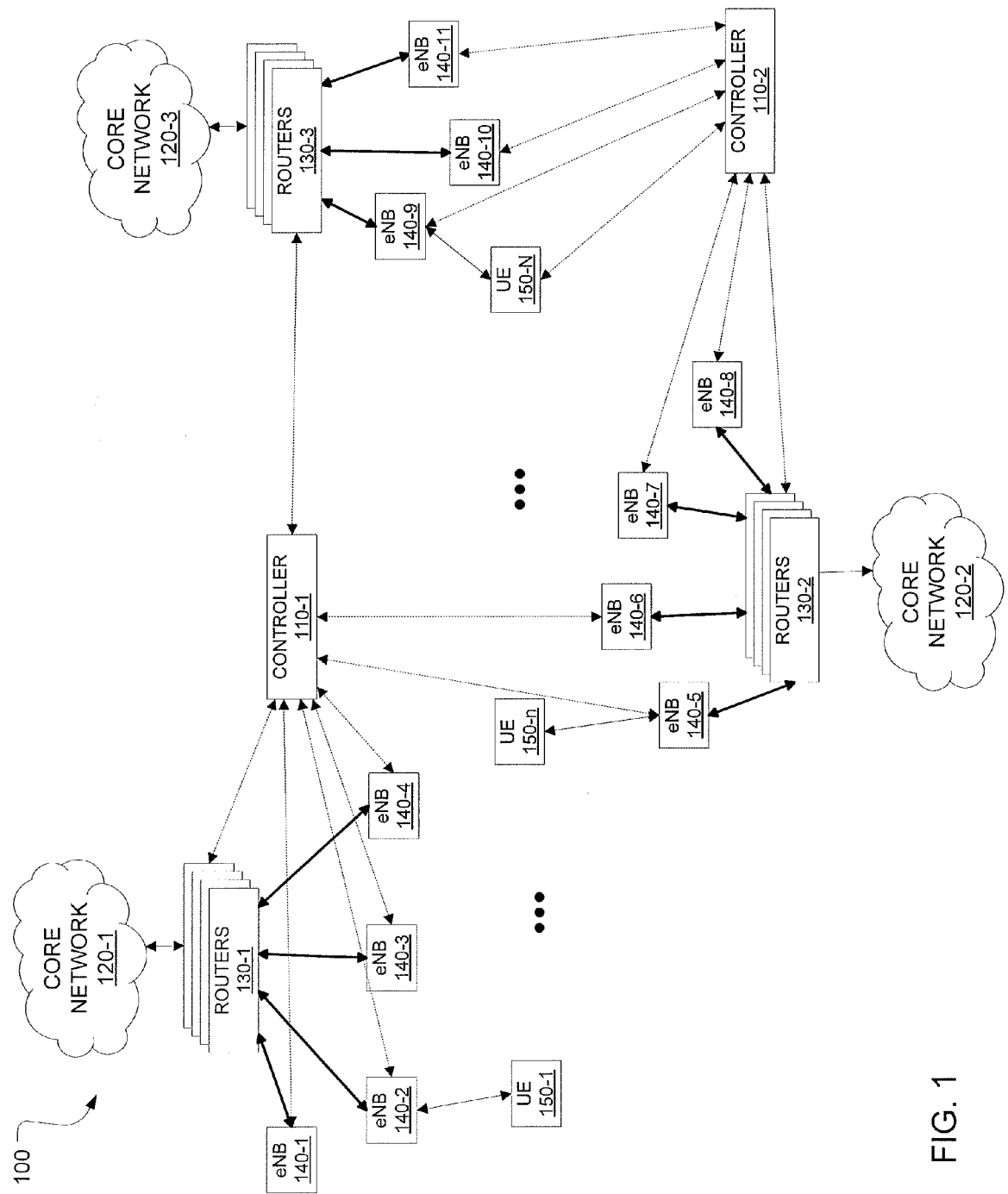
FIG. 1 is a block diagram of one embodiment of a wireless network.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The advent of cloud-based networking has complicated the ability of future wireless networks to satisfy expected demands for higher throughput, lower latencies, lower energy, lower costs, and drastically more numerous connections. Cloud-based networking fundamentally redefines the endpoints and the time frame for which network services are provisioned. It requires the network be much more nimble, flexible, and scalable. Thus, technologies such as network function virtualization (NFV) and software defined networking (SDN) have become increasingly important in building future wireless networks. NFV enables network functions that are traditionally tied to hardware to run on a cloud computing infrastructure in a data center. The separation of the data plane, the control plane, and the management plane from the hardware infrastructure will be a cornerstone of future wireless network architectures. One benefit is the ability to elastically support network functional demands. SDN is an architectural framework for creating intelligent programmable networks, where the control planes and the data planes are decoupled, network intelligence and state are logically centralized, and the underlying network infrastructure is abstracted from the application.

It is realized herein that SDN concepts are applicable to an LTE network and any future wireless network in the future. An SDN allows the RRC protocol to be centralized in a commodity, re-programmable server, where the policy decisions generated by the RRC can be altered easily by manufacturers, operators, or both, without having to deploy new network radio nodes, i.e., e-Node Bs (eNBs). The SDN also centralizes routing decisions, providing flexibility in routing adjustments that allow more dynamic and direct routing for mobile traffic, while also allowing independent distribution of data flow and control. This reduces, possibly eliminates, the need for centralized tunnel aggregation points. It is further realized herein the use of OpenFlow-enabled switches allows deployment of the SDN in networks without the need for standardization or product cycles from manufacturers and vendors.

The existing 3GPP architecture separates some amount of control into a mobility management entity (MME), which is responsible for exchanging non-access-stratum (NAS) messages with the UE, and controlling the establishment of tunnels between the eNB and core network elements such as serving gateways (SGWs). However, the packet routing function in a 3GPP network is limited to using tunnels, while many other methods of getting packets to their destination, such as flat routing, layer 2 VLANs, or optical circuits, are precluded from use.

It is realized herein, that by using OpenFlow protocols to control the eNB and the core network elements, an architecture can be created that makes air interface mobility management decisions in concert with packet redirection and rerouting in the core network. The architecture can be embodied in wireless networks and devices, such as LTE wireless eNBs and core networks.

The evolved packet core (EPC) is a network architecture that provides a functional framework for handling user data and user sessions for multiple users, i.e., UEs. The EPC connects an access network, such as an LTE access network, to one or more external networks. External networks can include the Internet, corporate networks, and the IP multimedia core network subsystem (IMS). The access network typically includes multiple radio nodes to which the various UEs connect to access the external networks or to communicate with other UEs on the access network.

The current evolved packet core (EPC) requires all packets to be routed through fixed packet data network (PDN) gateway (P-GW). This is inefficient for local traffic. For example, traffic between two UEs on the same eNB often traverses two different and very distant P-GWs.

SGWs transport IP data traffic between UEs and external networks. The SGWs serve as the interface between radio nodes and the EPC and also serve as an anchor point for UE sessions and for layer 2 mobility among radio nodes. The SGWs are logically connected to the PGW. The PGW anchors IP sessions for the UEs and serves as an interface between external networks and the EPC. The PGW transports IP data traffic to and from the external networks, which are sometimes referred to as PDNs.

It is realized herein an SDN for LTE can, in certain embodiments, provide customized mobility management and customized core network routing, such as in network sharing. These features may also be desirable for mobile virtual network operators (MVNOs). For example, some wholesale network operators require traffic to be routed on separate virtual local area networks (VLANs) for each partner. In certain embodiments, such as over the top (OTT) partnerships and new business models, the SDN provides for special treatment of certain network traffic. In other embodiments, the SDN can be used in analytics-based optimization, as is found in data-driven self-organizing networks (SONs).

FIG. 1 is a block diagram of a wireless network 100. Wireless network 100 includes central controllers 110-1 and 110-2, routers 130-1, 130-2, and 130-3, and eNBs 140-1 through 140-11. Wireless network 100 connects core networks 120-1, 120-2, and 120-3, and provides service to various UEs, such as UEs 150-1 through 150-N. Core networks 120-1, 120-2, and 120-3 are accessible via respective attached routers. Core network 120-1 is accessible through routers 130-1, to which eNBs 140-1 through 140-4 are attached. Likewise, core network 120-2 is accessible through routers 130-2 and core network 120-3 is accessible through routers 130-3.

eNBs 140-1 through 140-11 are network radio nodes and are sometimes referred to as access points, or Node Bs. UEs 150-1 through 150-N are sometimes referred to as stations, mobile stations, mobiles, terminals, users, or subscribers. Controllers 110-1 and 110-2 are central SDN controllers configured to control routers 130-1, 130-2, and 130-3 and eNBs 140-1 through 140-11.

Figure 2:
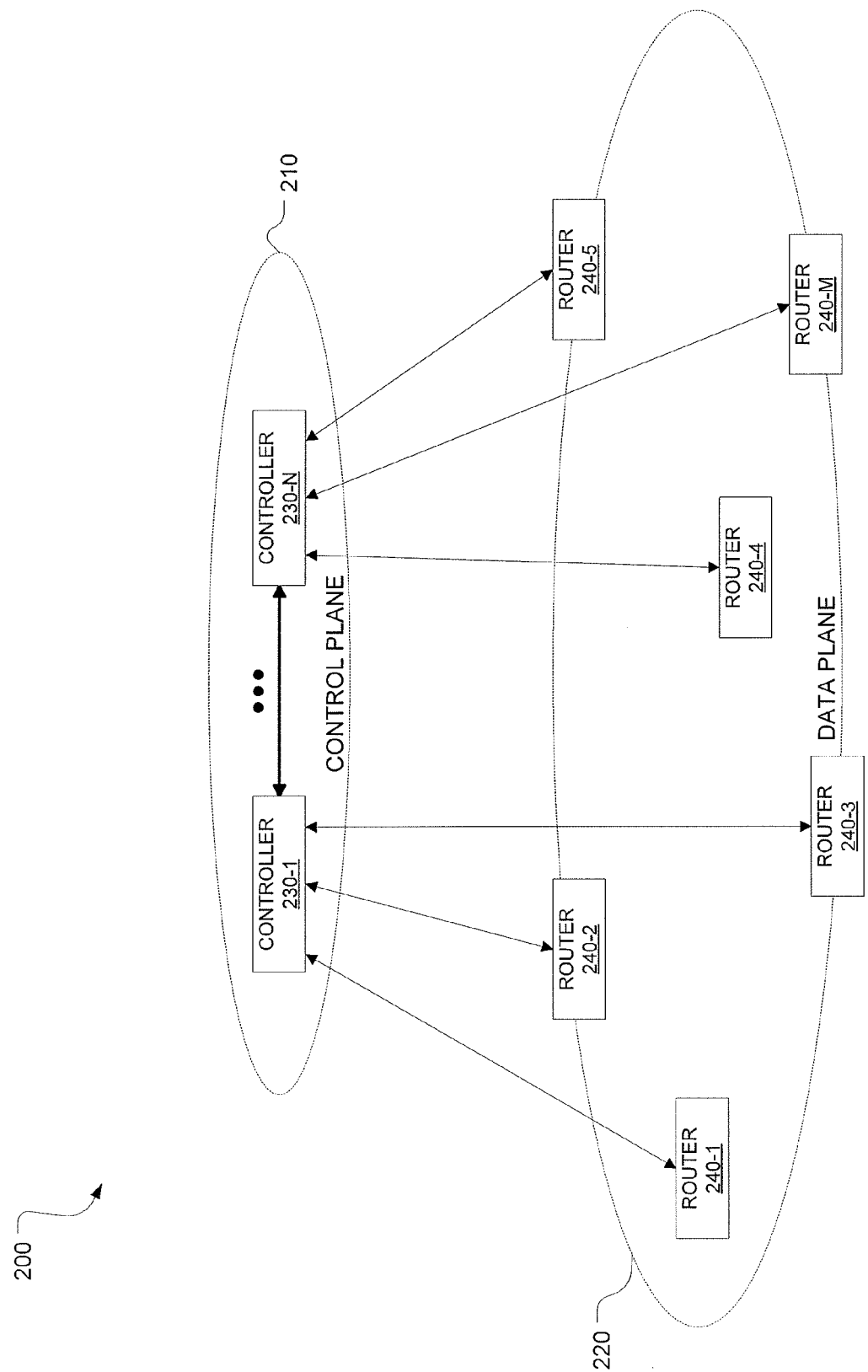
FIG. 2 is a block diagram of one embodiment of a communication system.

FIG. 2 is a block diagram of one embodiment of a communication system 200. Communication system 200 is divided into a data plane 220 and a control plane 210. Network traffic travels over data plane 220, while control signaling travels over control plane 210. Control plane 210 and data plane 220 are separated to allow for distributed routing by routers 240-1 through 240-M in data plane 220. The separation also provides centralized control in controllers 230-1 through 230-N.

Figure 3:
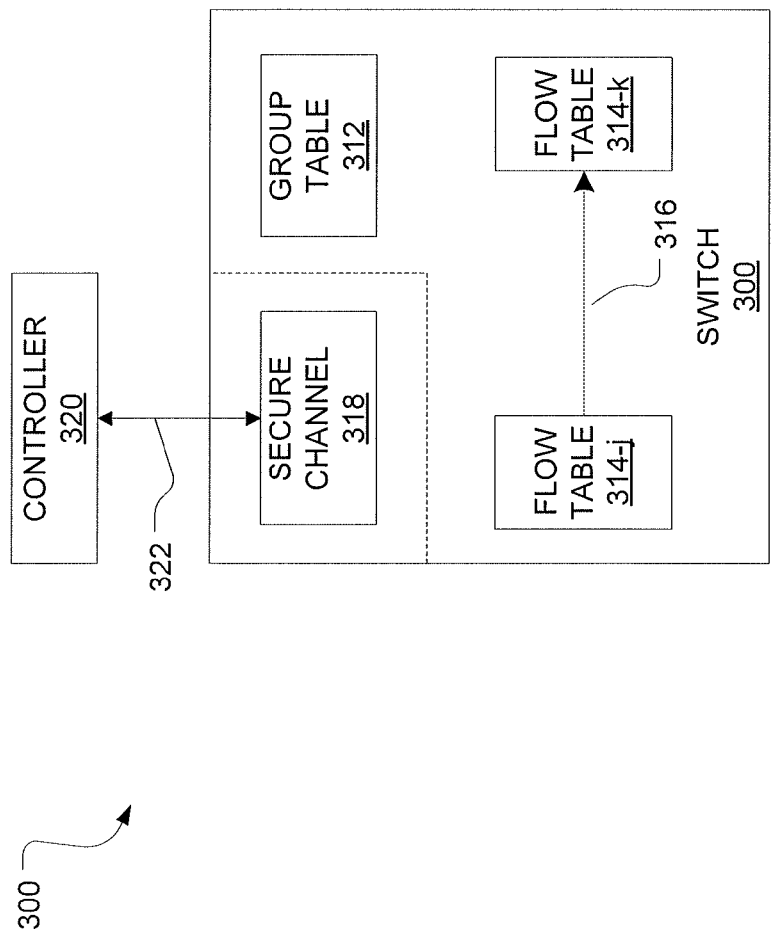
FIG. 3 is a block diagram of one embodiment of an OpenFlow switch.

FIG. 3 is a block diagram of one embodiment of an OpenFlow enabled switch 300. Switch 300 includes a group table 312, multiple flow tables 314-*j* through 314-*k*, and a secure channel 318. Switch 300 is configured by a controller 320 via an OpenFlow protocol 322. Controller 320 can send and receive control packets through switch 300 through secure channel 318. Controller 320 configures flow tables 314-*j* through 314-*k*, which contain corresponding rules and actions for routing network traffic. Each logical and physical interface is modeled as a port, e.g.:

```
/* Description of a port */
struct ofp_port {
    uint32_t port_no;
    uint8_t pad[4];
    uint8_t hw_addr[OFP_ETH_ALEN];
    uint8_t pad2[2]; /* Align to 64 bits. */
    char name[OFP_MAX_PORT_NAME_LEN];
    /* Null-terminated */
    uint32_t config; /* Bitmap of OFPPC_* flags. */
    uint32_t state; /* Bitmap of OFPPS_* flags. */
    /* Bitmaps of OFPPF_* that describe features. All bits zeroed if
     * unsupported or unavailable. */
    uint32_t curr; /* Current features. */
    uint32_t advertised; /* Features being advertised by the port. */
    uint32_t supported; /* Features supported by the port. */
    uint32_t peer; /* Features advertised by peer. */
    uint32_t curr_speed; /* Current port bitrate in kbps. */
    uint32_t max_speed; /* Max port bitrate in kBps */
};
OFP_ASSERT(sizeof(struct ofp_port) == 64);
```

Figure 4:
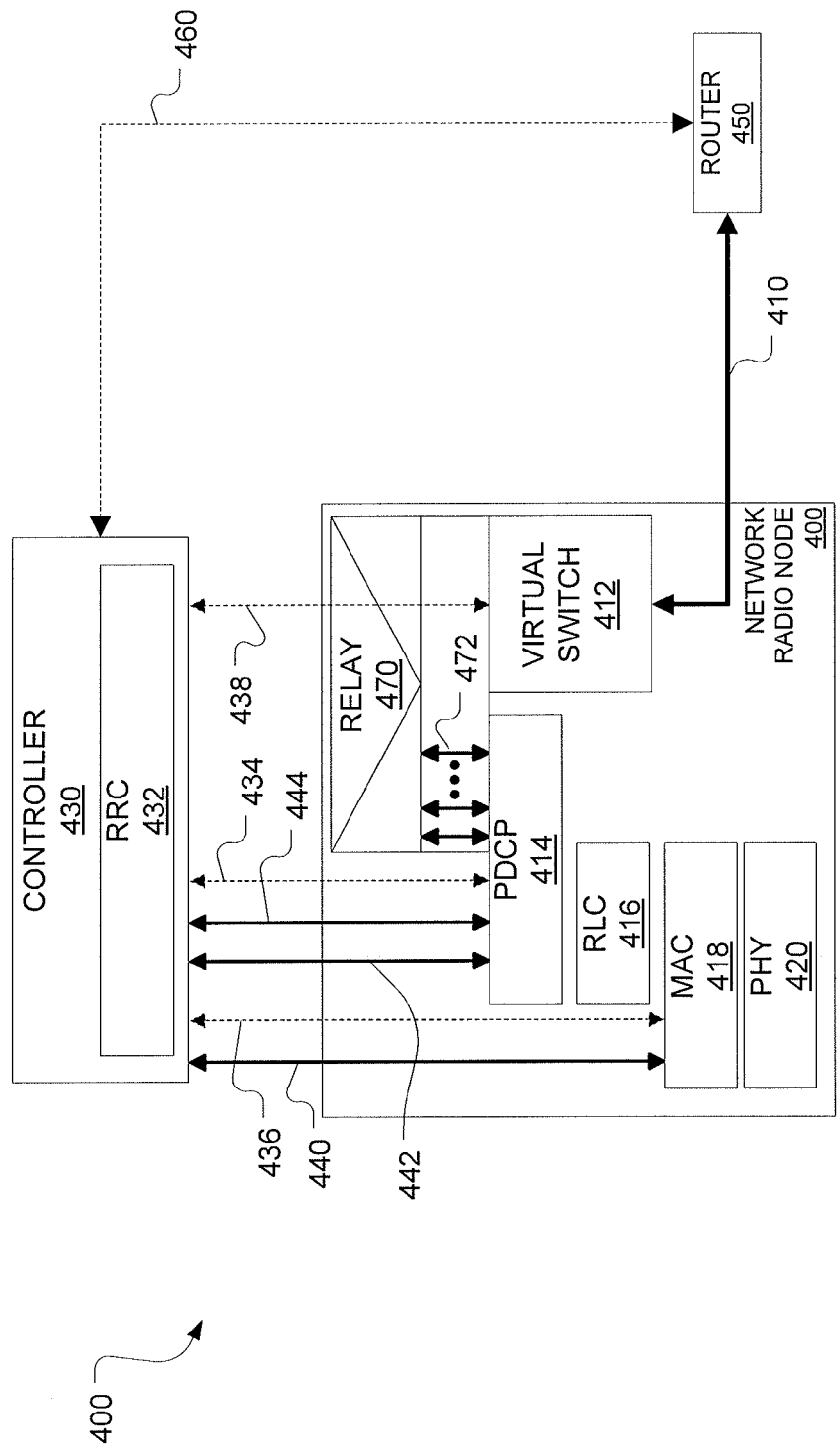
FIG. 4 is a block diagram of one embodiment of a network radio node.

FIG. 4 is a block diagram of one embodiment of a network radio node 400 with OpenFlow control. Radio node 400 receives network traffic from a router 450 over a backhaul link 410. Radio node 400 and router 450 are controlled by a controller 430. Controller 430 is remotely disposed from router 450 and radio node 400. Controller 430 sends control messages to router 450 using an OpenFlow wireline protocol. Controller 430 then generates and sends control messages to router 450 and radio node 400 via the OpenFlow protocol. The addition of OpenFlow control capability presents alternative traffic routing to general packet radio service (GPRS) tunneling protocol (GTP). Virtual switch 412 is configurable by controller 430 using the OpenFlow protocol.

Radio node 400 includes a virtual switch 412, a relay 470, a packet data convergence protocol (PDCP) layer 414, a radio link control (RLC) layer 416, a media access control (MAC) layer 418, and a physical (PHY) layer 420. PDCP layer 414 is a layer-2 data plane protocol implemented in UEs and radio nodes, i.e., eNBs. PDCP layer 414 sends and receives packets among UEs and eNBs over an air interface. PDCP layer 414 works with other layer-2 protocols, including RLC layer 416 and MAC layer 418. PDCP layer 414 operates on top of RLC layer 416 and transfers uplink (UL) packets to the core network through relay 470, virtual switch 412, and router 450. PDCP layer 414 receives downlink (DL) packets from router 450 and sends those to RLC layer 416, which passes them to the UEs through MAC layer 418 and PHY layer 420.

RRC 432, in controller 430, configures PDCP layer 414 and RLC layer 416. The configuring is done over a control channel 434 using an OpenFlow protocol. Likewise, MAC layer 418 and PHY layer 420 are configurable by controller 430 via another control channel 436, which also uses the OpenFlow protocol. Below are examples of control messages generated by controller 430 for configuring various protocol layers using OpenFlow protocols.

System information blocks are configured by the controller in eNB. The controller sends OFP_PACKET_OUT messages with experimental action. The messages include periodic scheduling information. The system information blocks are mostly transparent to eNB, except cdma2000 system time. eNB finds it and updates it before every SIB8 broadcast.

```
struct ofp_action_lte_BCCH_DLSCH_packet_out {
    uint16_t type;            /* OFPAT_EXPERIMENTER */
    uint16_t len;             /* Length is 32. */
    uint32_t experimenter;    /* OUI. */
    uint32_t exp_type;        /* OFP_LTE_AT_BCCH_DLSCH_PACKET_OUT */
    uint32_t port;            /* Configure BCCH on this cell. */
    uint8_t windowlength;     /* Window size in ms */
    uint8_t rank;             /* Small integer n from 36.331,
                                 Section 5.2.3. 0 is special. */
    uint16_t periodicity;     /* Number of system frames between
                                 repetitions. */
    uint32_t modPeriod;       /* Wait until SFN mod modPeriod = 0
                                 before updating the packet. */
    uint32_t cdma2000Time;    /* 0=none, 1=sync, 2=async. */
    uint32_t sysTimeOffset;   /* Bit offset into the packet to
                                 find cdma2000 System Time. */
};
OFP_ASSERT(sizeof(struct ofp_action_lte_BCCH_DLSCH_packet_out) == 32);
```

460. Controller 430 sends control messages to radio node 400 using an OpenFlow wireless protocol.

Controller 430 includes a centralized RRC module 432 configured to make policy decisions according to the RRC protocol. New RLC or PDCP instances are set up according to the control message below. OFP_PACKET_OUT with another experimental action is used. Setup is performed simultaneously with the sending of a RRC message to the UE.

```
struct ofp_action_lte_set_pdcp_rlc_maclc {
    uint16_t type;            /* OFPAT_EXPERIMENTER */
```

```
    uint16_t len;              /* Length is 56. */
    uint32_t experimenter;     /* OUI. */
    uint32_t exp_type;         /* OFP_LTE_AT_SET_PDCP_RLC_MACLC */
    uint32_t port;             /* CellId, LCID, and RNTI. */
    uint32_t rbIdentity;       /* 1 or 2 for SRB, 1 - 32 for DRB. */
    uint32_t maxCIDs;          /* PDCP ROHC configuration. */
    uint32_t profiles;         /* Bitmap of ROHC profiles supported. */
    uint16_t rlcMode;          /* RLC Parameters */
    uint16_t dlam_tpollrtx;
    uint16_t dlam_pollpdu;
    uint16_t dlam_pollbyte;
    uint16_t dlam_maxrtxthresh;
    uint16_t ul_treordering;
    uint16_t ulam_tstatusprhbit;
    uint16_t dlum_snlength;
    uint16_t ulum_snlength;
    uint16_t priority;         /* MAC Parameters */
    uint16_t prioBitrate;
    uint16_t bucketSizeDur;
};
OFP_ASSERT(sizeof(struct ofp_action_lte_set_pdcp_rlc_maclc) == 56);
```

Security is set up according to the control message below. Ciphering and integrity protection are implemented in PDCP layer 414. OFP_PACKET_OUT with another experimental action is used. Security can be set up simultaneously with the transmission of the security mode command message to the UE.

```
struct ofp_action_lte_set_security {
    uint16_t type;             /* OFPAT_EXPERIMENTER */
    uint16_t len;              /* Length is 56. */
    uint32_t experimenter;     /* OUI. */
    uint32_t exp_type;         /* OFP_LTE_AT_SET_SECURITY */
    uint32_t port;             /* CellID and RNTI. */
    uint32_t cipheringAlg;
    uint32_t integrityAlg;
    uint8_t KeNB[32];
};
OFP_ASSERT(sizeof(struct ofp_action_lte_set_security) == 56);
```

PDCP layer 414 establishes data radio bearers (DRBs) 472 over which data packets travel between radio node 400 and UEs. Each of DRBs 472 is established in relay 470 between a virtual port on virtual switch 412 and a UE. The DRB flows through PDCP layer 414, RLC layer 416, MAC layer 418, and PHY layer 420. Each layer processes the data packets as they flow up or down the protocol stack. Similarly, PDCP layer 414 establishes signal radio bearers (SRBs) 440, 442, and 444. The SRBs are used for control signaling between radio node 400 and the UEs it serves. Similar to DRBs 472, the SRBs flow through the protocol stack. SRBs 442 and 444 flow from controller 430 to the UEs through PDCP layer 414, RLC layer 416, MAC layer 418, and PHY layer 420. SRB 440 flows from controller 430 through MAC layer 418 and PHY layer 420.

Controller 430, virtual switch 412, PDCP layer 414, RLC layer 416, MAC layer 418, PHY layer 420, and RRC 432 can be implemented in one or more processors, one or more application specific integrated circuits (ASICs), one or more field-programmable gate arrays (FPGAs), dedicated logic circuitry, or any combination thereof, all collectively referred to as a processor. The respective functions for controller 430, virtual switch 412, PDCP layer 414, RLC layer 416, MAC layer 418, PHY layer 420, and RRC 432 can be stored as instructions in non-transitory memory for execution by the processor.

Figure 5:
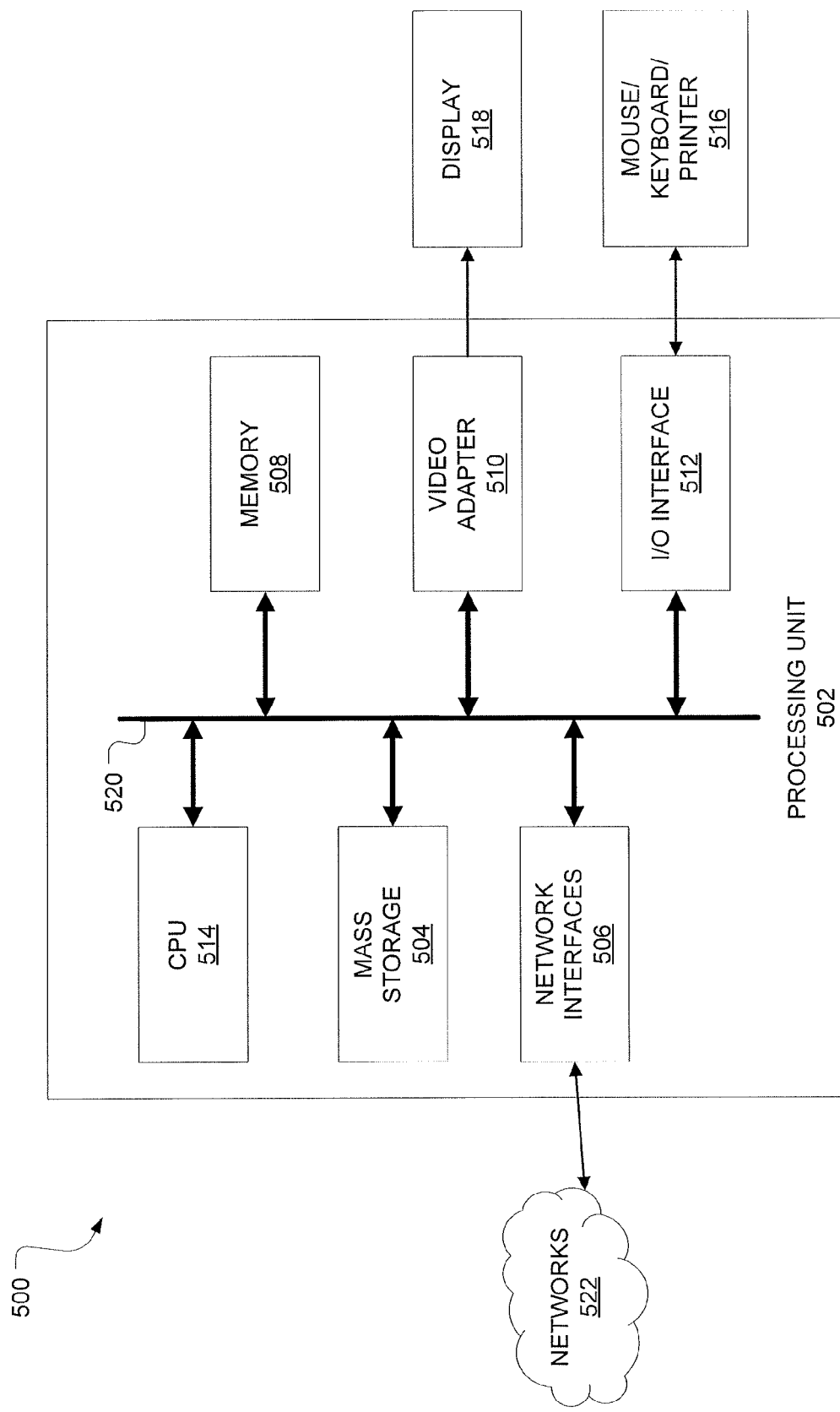
FIG. 5 is a block diagram of one embodiment of a computing system.

FIG. 5 is a block diagram of a computing system 500 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 500 may comprise a processing unit 502 equipped with one or more input/output devices, such as a speaker, microphone, mouse, touchscreen, keypad, keyboard, printer, display, and the like. The processing unit may include a central processing unit (CPU) 514, memory 508, a mass storage device 504, a video adapter 510, and an I/O interface 512 connected to a bus 520.

The bus 520 may be one or more of any type of several bus architectures including a memory bus or memory controller, a peripheral bus, video bus, or the like. The CPU 514 may comprise any type of electronic data processor. The memory 508 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 508 may include ROM for use at boot-up, and DRAM for program and data storage for use while executing programs.

The mass storage 504 may comprise any type of non-transitory storage device configured to store data, programs, and other information and to make the data, programs, and other information accessible via the bus 520. The mass storage 504 may comprise, for example, one or more of a solid state drive, hard disk drive, a magnetic disk drive, an optical disk drive, or the like.

The video adapter 510 and the I/O interface 512 provide interfaces to couple external input and output devices to the processing unit 502. As illustrated, examples of input and output devices include a display 518 coupled to the video adapter 510 and a mouse/keyboard/printer 516 coupled to the I/O interface 512. Other devices may be coupled to the processing unit 502, and additional or fewer interface cards may be utilized. For example, a serial interface such as Universal Serial Bus (USB) (not shown) may be used to provide an interface for a printer.

The processing unit 502 also includes one or more network interfaces 506, which may comprise wired links, such as an Ethernet cable or the like, and/or wireless links to access nodes or different networks. The network interfaces 506 allow the processing unit 502 to communicate with remote units via the networks. For example, the network interfaces 506 may provide wireless communication via one or more transmitters/transmit antennas and one or more receivers/receive antennas. In an embodiment, the processing unit 502 is coupled to a local-area network 522 or a wide-area network for data processing and communications with remote devices, such as other processing units, the Internet, remote storage facilities, or the like.

Figure 6:
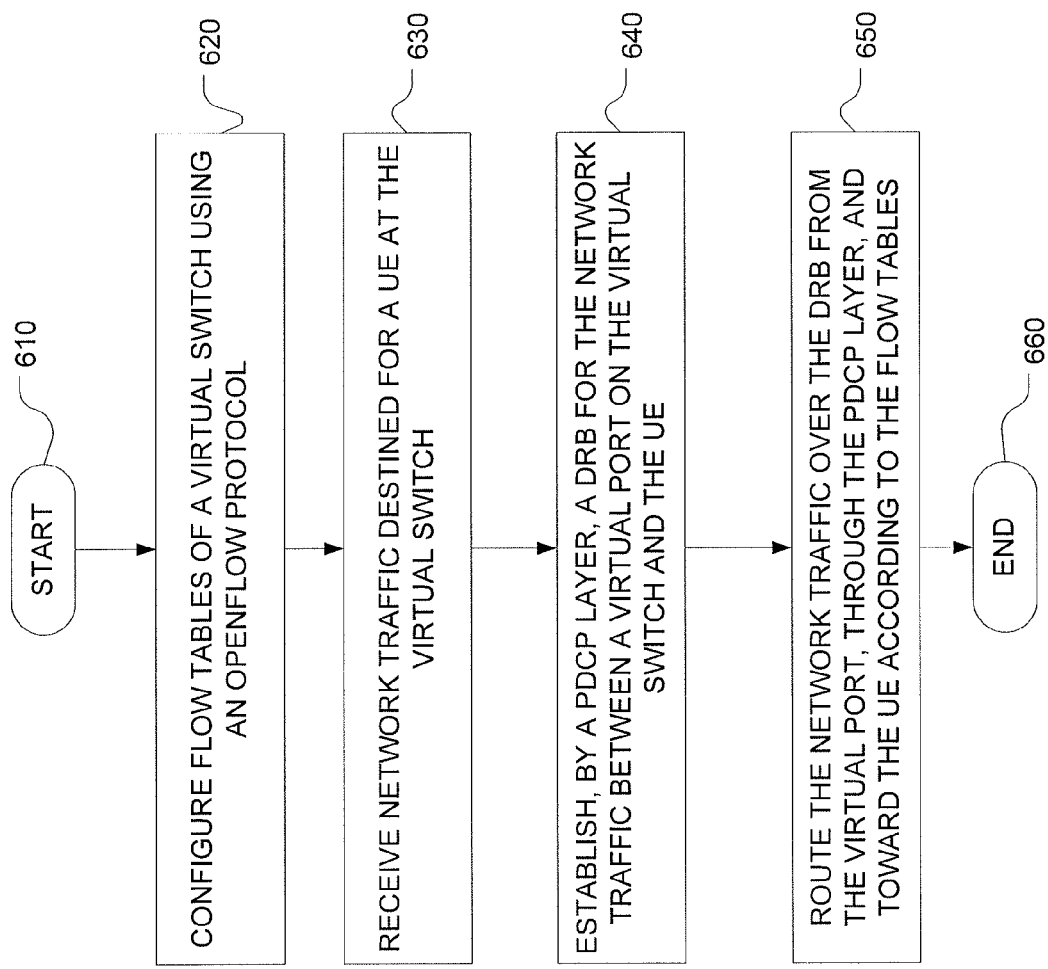
FIG. 6 is a flow diagram of one embodiment of a method of routing network traffic.

FIG. 6 is a flow diagram of one embodiment of a method of routing network traffic. The method begins at a start step 610. At a configuring step 620, a virtual switch is configured using an OpenFlow protocol. The virtual switch contains flow tables each having flow-entries. Each flow-entry has an associated action to be carried out for routing network traffic. The flow-entries are generated by a controller according to a routing policy. The controller sends the flow-entries to the virtual switch over a secure channel according to the OpenFlow protocol. The controller can be co-located with the virtual switch or can be remote. For example, in certain embodiments, the controller is located at a central SDN controller and the virtual switch is disposed within an eNB.

At a receiving step 630, network traffic destined for a UE is received at the virtual switch. A PDCP layer establishes a DRB for the network traffic at an establishing step 640. The DRB connects a virtual port on the virtual switch with the UE. The virtual port is configured by the controller according to the OpenFlow protocol. The traffic is then routed over the DRB according to the flow tables in the virtual switch at a routing step 650. The method ends at an end step 660.

Several use cases for the core network are discussed below. These include a flat, distributed mobility management architecture, services including traffic steering, lawful intercept, QoS routing and mobility management, and security. Another use case is cross-technology radio resource management—per-flow HetNets. Other use cases include a simplified platform for operational support systems and network sharing.

Figure 7:
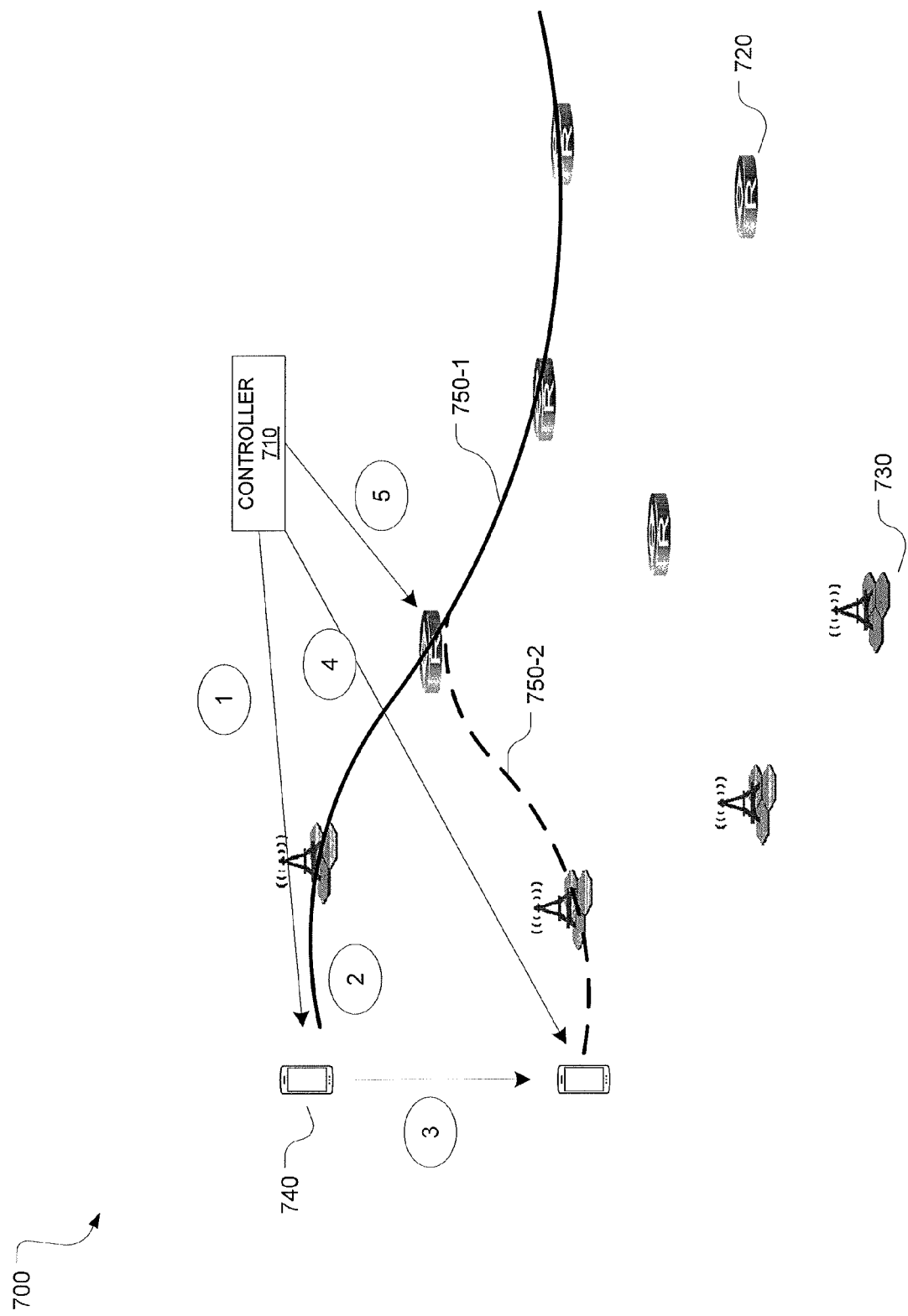
FIG. 7 is an illustration of distributed mobility management in a wireless network.

FIG. 7 is an illustration of distributed mobility management in a wireless network 700. Wireless network 700 includes a controller 710, routers 720, and network radio nodes 730. Controller 710 is an embodiment central SDN controller for the network. For a UE 740 to attach to wireless network 700, controller 710 first sends a router advertisement with a prefix that routes directly to a local gateway (L-GW). UE 740 then starts the flow, routing directly without any tunneling. This establishes a route 750-1. When UE 740 moves to a new network radio node, controller 710 re-routes the existing flow by installing state at all of the appropriate routers. Controller 710 sends another router advertisement deprecating the original prefix and including a new prefix that routes directly to a new L-GW. UE 740 continues to use the new prefix for new flows.

Figure 8:
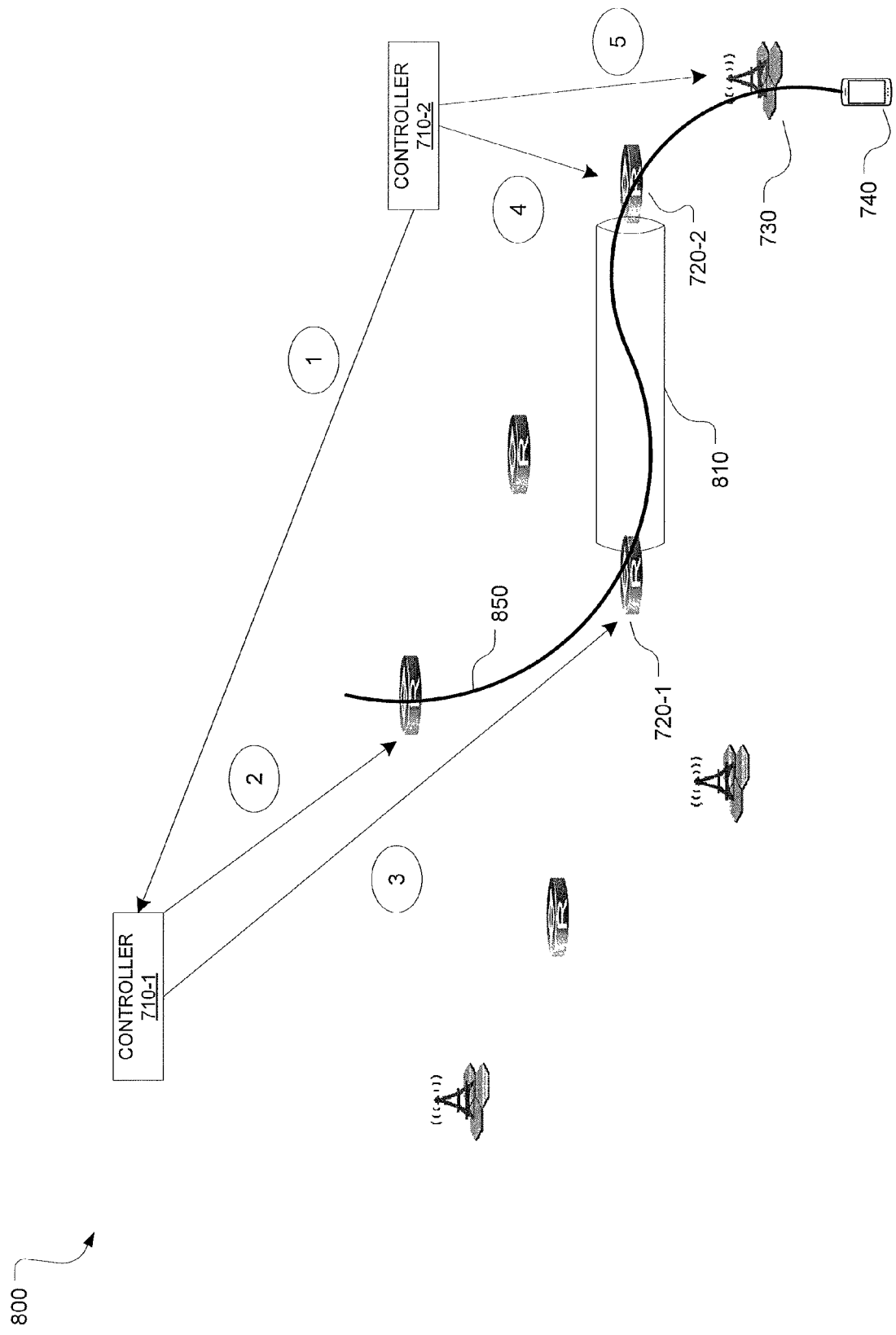
FIG. 8 is an illustration of UE movement within a wireless network.

FIG. 8 is an illustration of UE movement within a wireless network 800. Wireless network 800 uses distributed mobility management and includes controller 710-1 and 710-2, routers 720 and network radio nodes 730. When UE 740 moves from controller 710-1 to 710-2, controller 710-2 sends a message to controller 710-1 over an interface, which can be a proprietary interface or a standardized interface. Controller 710-1 then installs a forwarding state at all the appropriate routers in its domain, the forwarding being to a designated anchor router 720-1. Controller 710-1 then installs a tunneling state at anchor router 720-1, forming a tunnel 810. Controller 710-2 installs a de-tunneling state at a designated router 720-2 it its own domain. Controller 710-2, the new controller, then sends a router advertisement to UE 740 containing an old prefix, which is deprecated, and a new prefix that is locally routed, via a route 850, to a new L-GW.

Figure 9:
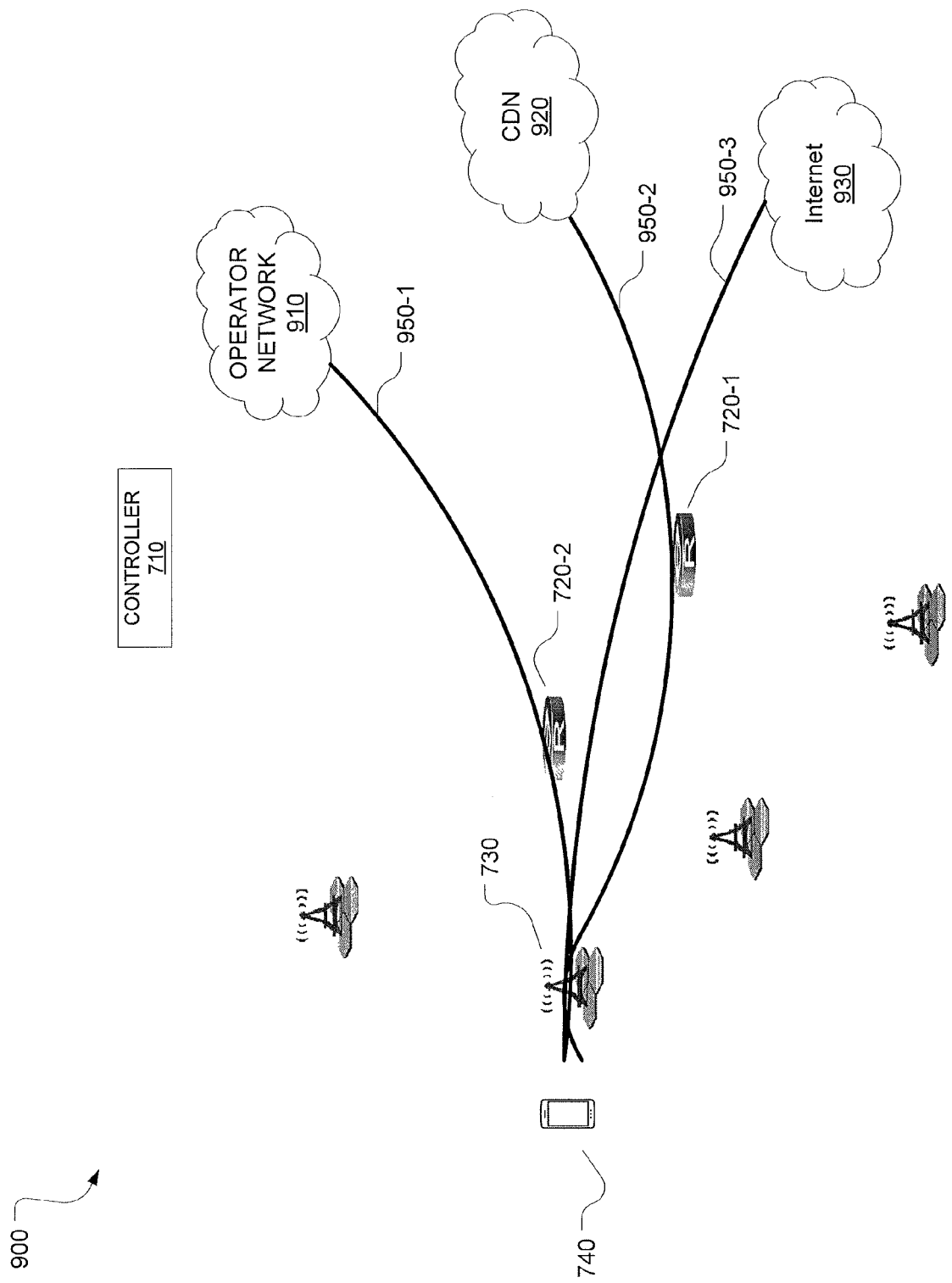
FIG. 9 is an illustration of per-flow traffic steering in a wireless network.

FIG. 9 is an illustration of per-flow traffic steering in a wireless network 900. Wireless network 900 includes controller 710, routers 720, and network radio nodes 730. Wireless network 900 also connects to an operator network 910, a content data network (CDN) 920, and the Internet 930. In wireless network 900, IP multimedia core network subsystem (IMS) traffic is steered from UE 740 to a low-latency operator network, operator network 910, via a route 950-1. CDN traffic is steered to CDN 920 via a route 950-2. Internet traffic is offloaded immediately to the Internet 930.

Figure 10:
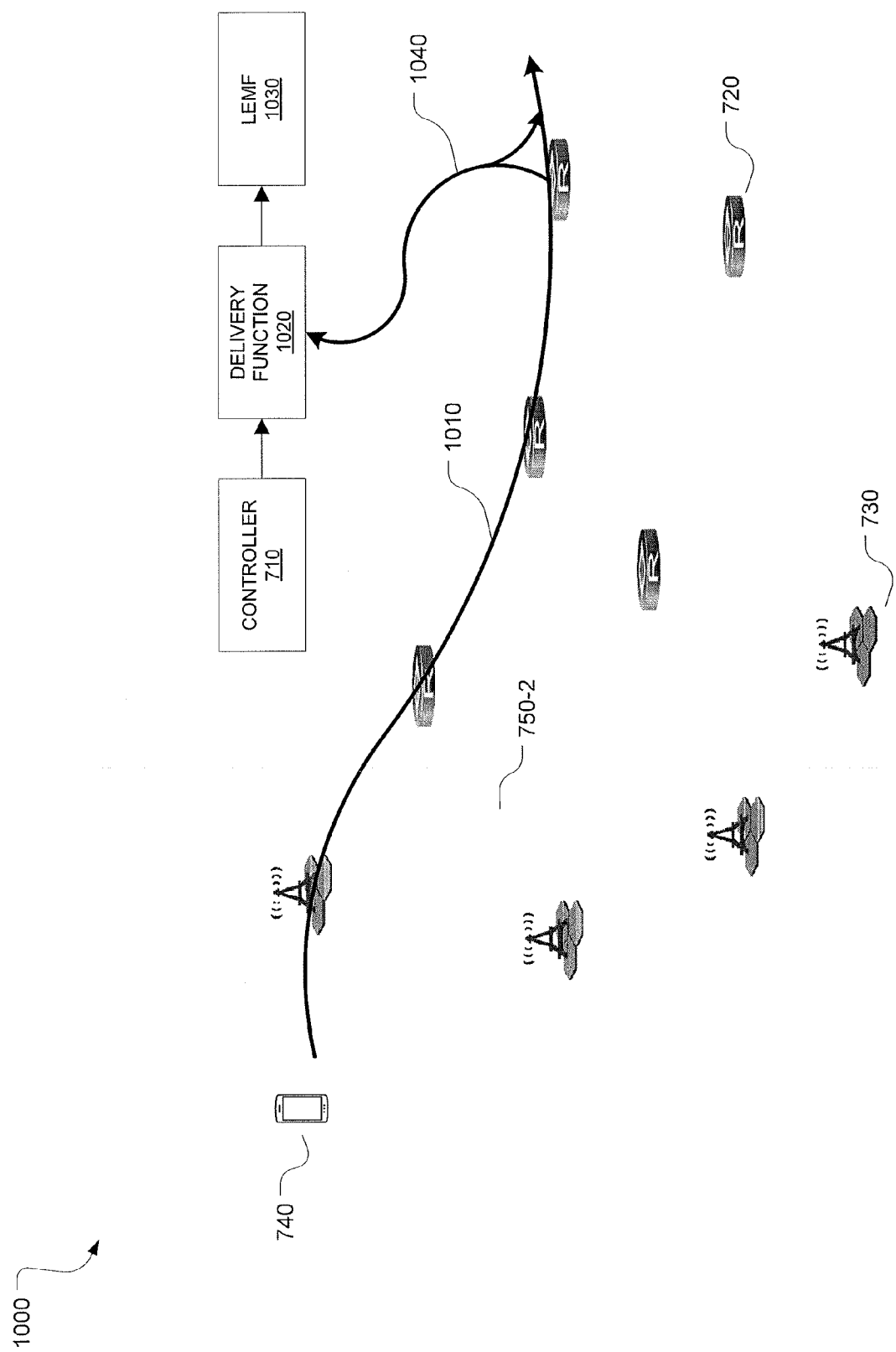
FIG. 10 is an illustration of lawful intercept in a wireless network.

FIG. 10 is an illustration of lawful intercept in a wireless network 1000. Wireless network 1000 includes controller 710, routers 720, and network radio nodes 730. For lawful intercept of network traffic for UE 740, a router, located deeply into the core network as possible to avoid detection by the subject, duplicates each flow. This is illustrated by flow 1040. Alternatively, the duplication can occur at an L-GW for direct UE-to-UE communication that avoids the backhaul. The duplicated flow is destined for a delivery function 1010 and then a law enforcement monitoring facility (LEMF) 1030. Delivery function 1010 and LEMF 1030 are coupled to controller 710, which sees the implementation of each flow.

Figure 11:
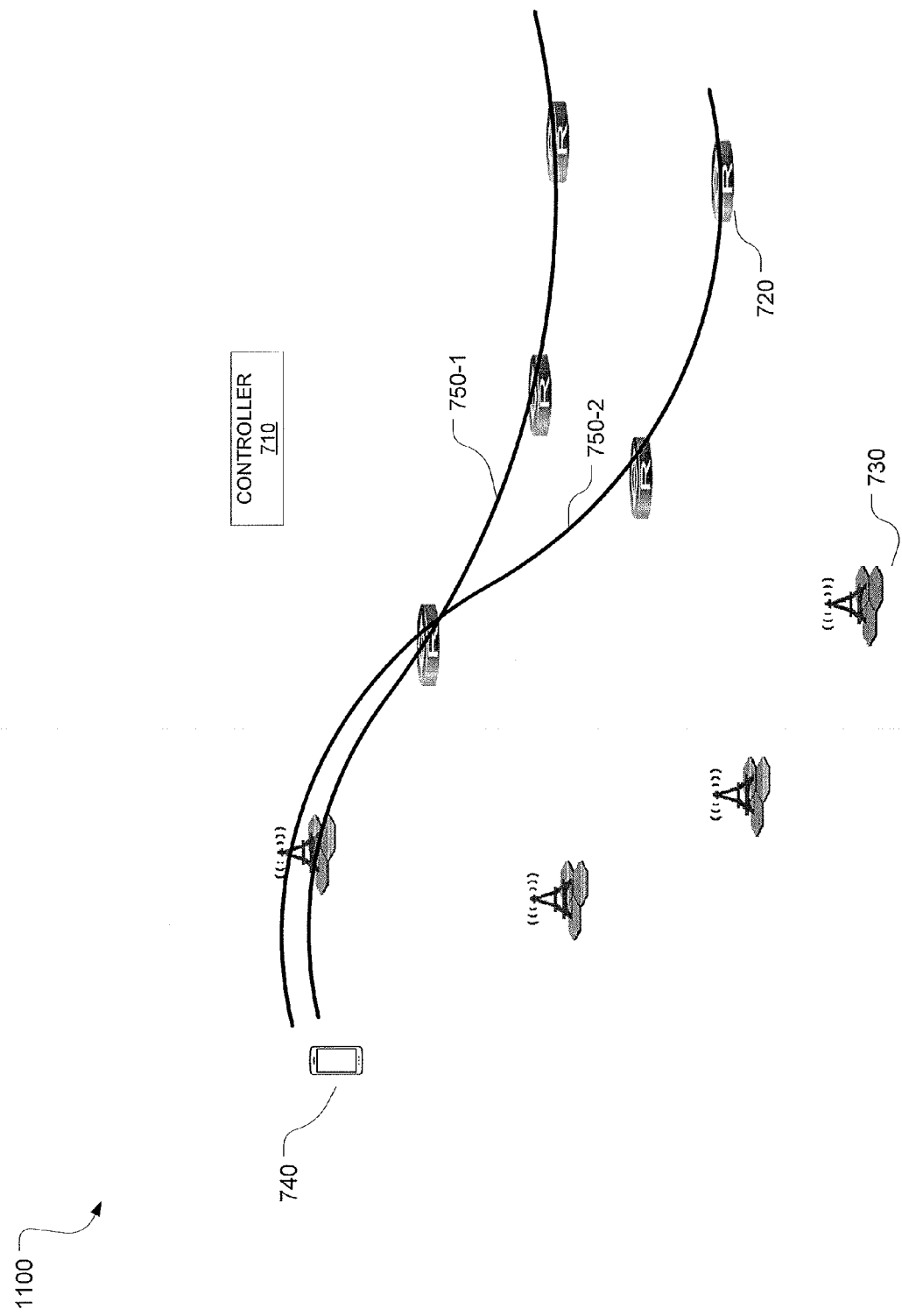
FIG. 11 is an illustration of quality of service (QoS) routing in a wireless network.

FIG. 11 is an illustration of quality of service (QoS) routing in a wireless network 1100. Wireless network 1100 includes controller 710, routers 720, and radio network nodes 730. For QoS routing, consider a data flow 750-1 and a voice over IP (VoIP) flow 750-2, both from UE 740. VoIP flow 750-2 is routed over a low-latency path, such as a virtual local area network (VLAN). Data flow 750-1 has more relaxed QoS requirements and does not require the low-latency path.

Figure 12:
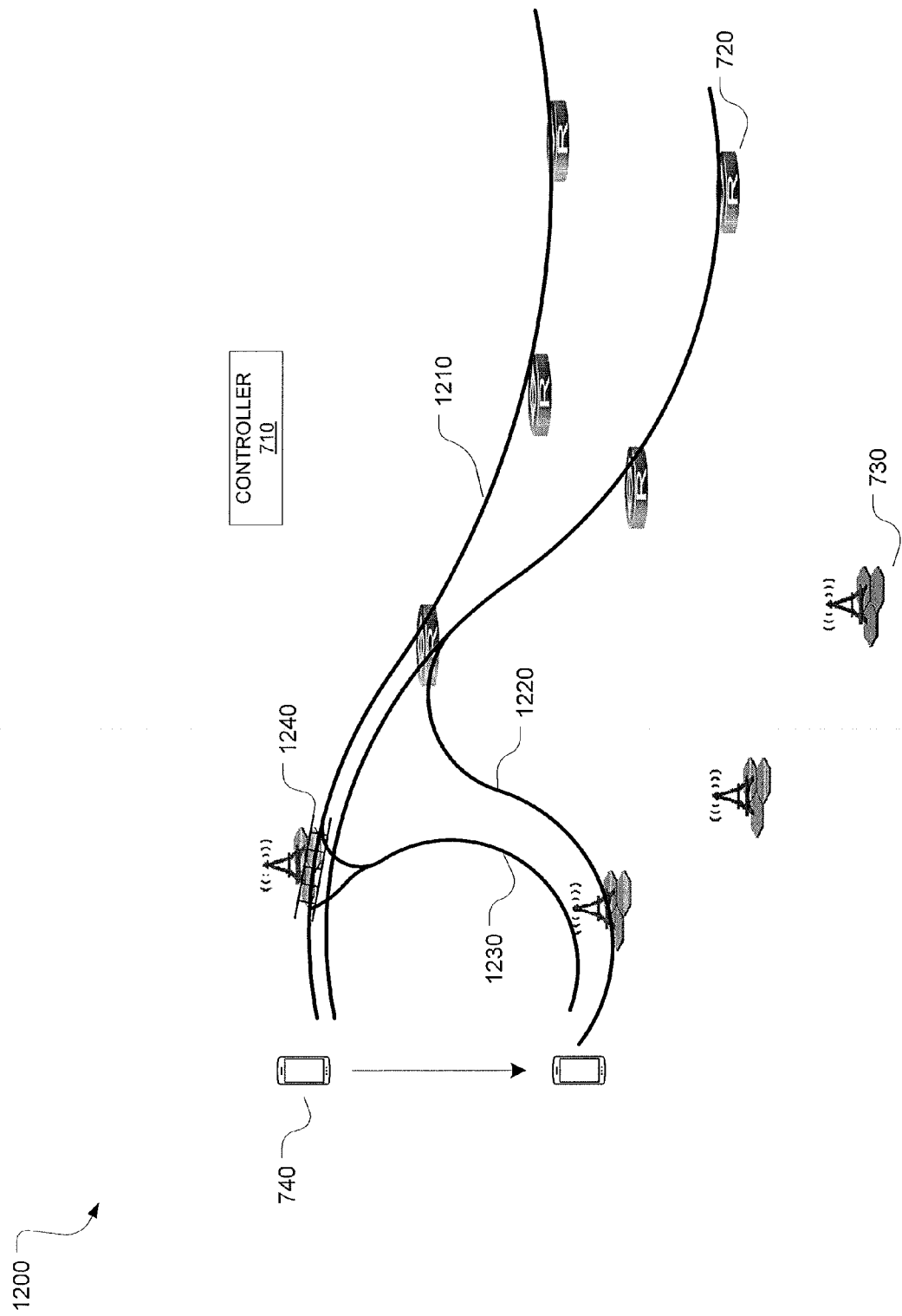
FIG. 12 is an illustration of QoS mobility management in a wireless network.

FIG. 12 is an illustration of QoS mobility management in a wireless network 1200. Wireless network 1200 includes controller 710, routers 720, and network radio nodes 730. Mobility management strategies can vary for different traffic types. For example, for a VoIP flow 1220, the mobility management strategy can include make-before-break, duplication, and packet drop. For data flows 1210 and 1230, the mobility management strategy can include, for example, lossless buffering.

Figure 13:
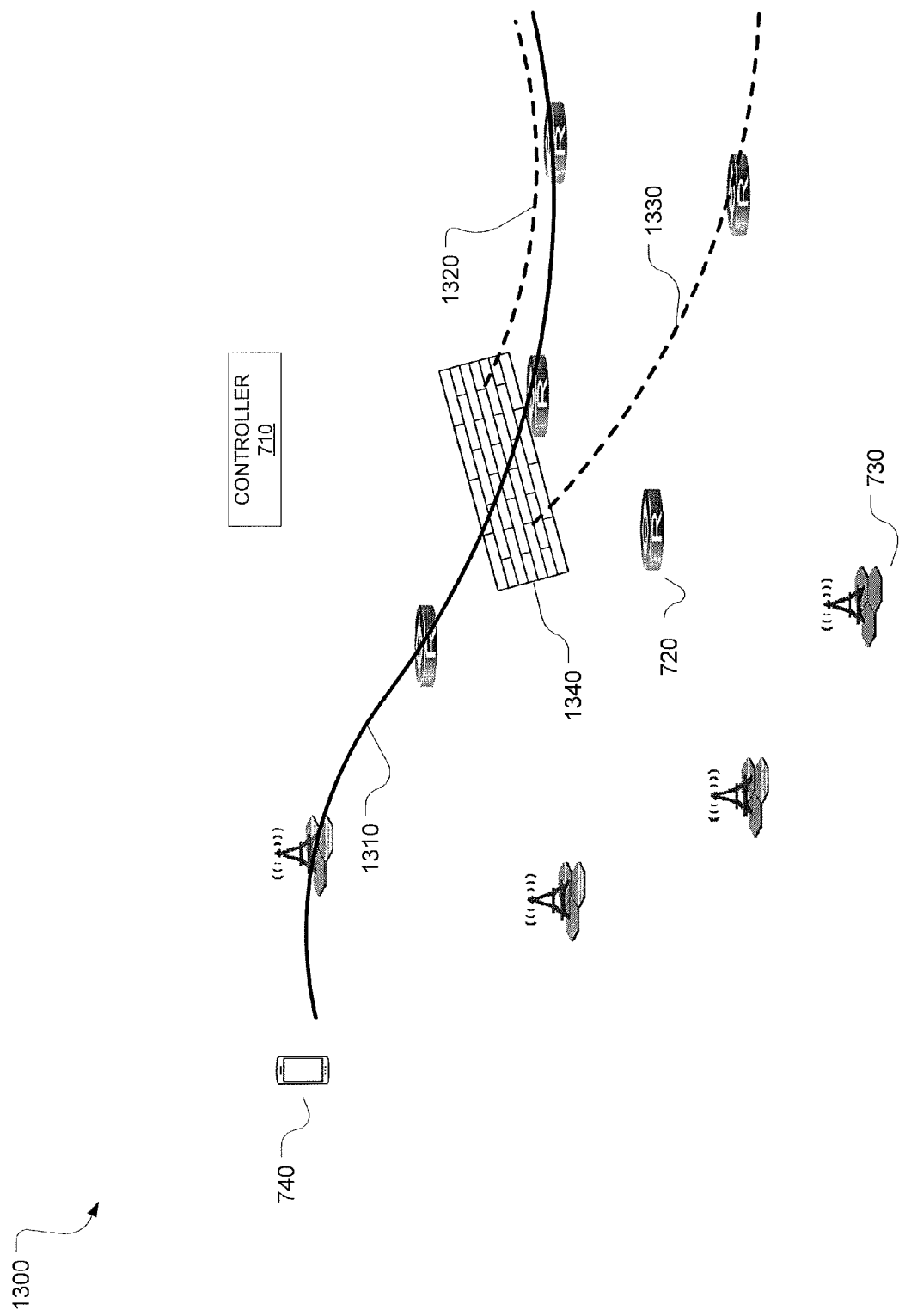
FIG. 13 is an illustration of a firewall in a wireless network.

FIG. 13 is an illustration of a firewall in a wireless network 1300. Wireless network 1300 includes controller 710, routers 720, and network radio nodes 730. Wireless network 1300 also includes a firewall 1340. Controller 710 allows simple implementation of statefull firewalls. Each flow is validated against a policy prior to installing state. For example, flows 1320 and 1330, initiated from the Internet, are dropped, while flow 1310 passes through. This allows wireless network 1300 to stop denial of service (DoS) attacks closer to the source.

Figure 14:
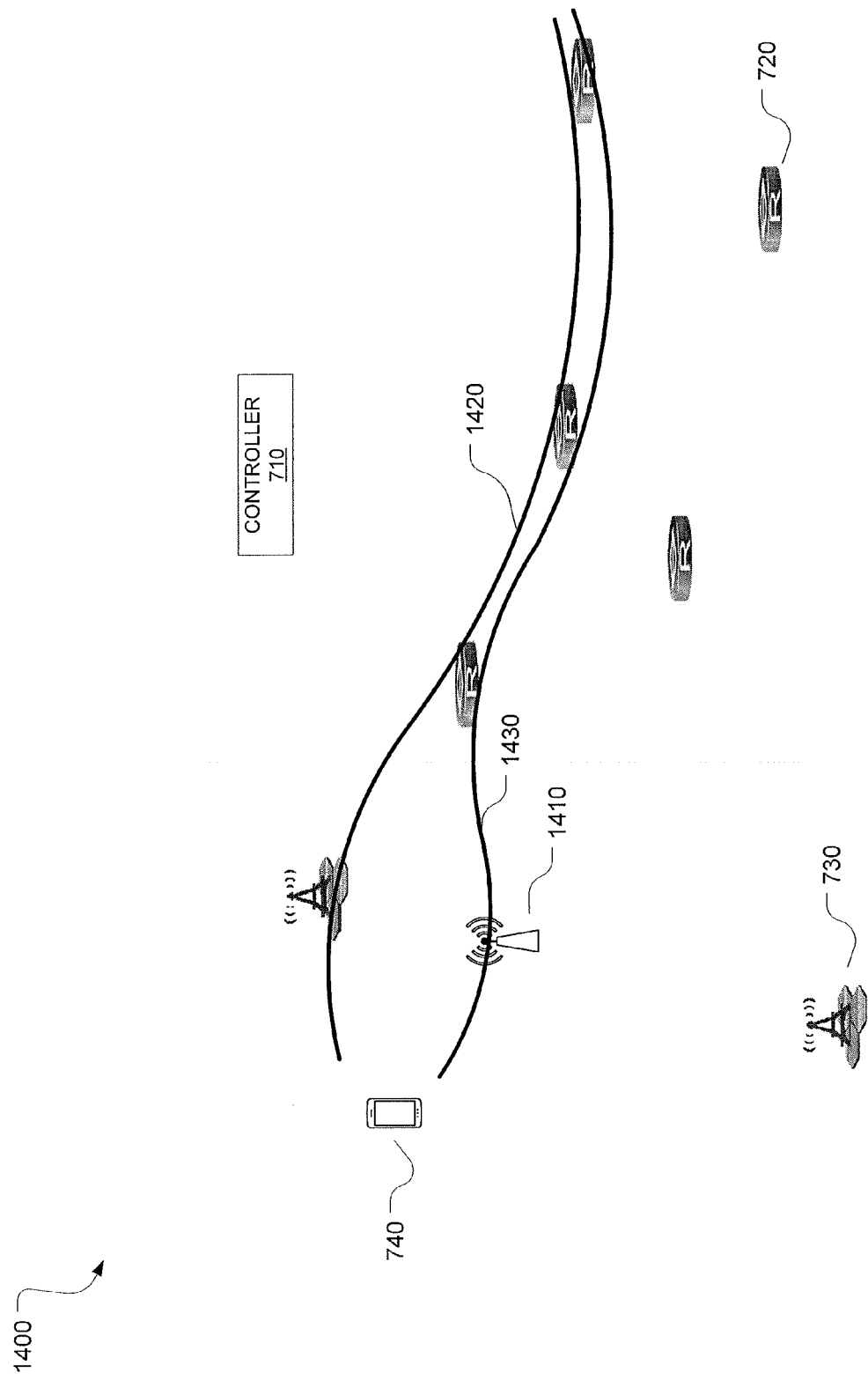
FIG. 14 is an illustration of a HetNet in a wireless network.

FIG. 14 is an illustration of a heterogeneous network (HetNet) in a wireless network 1400. Wireless network 1400 includes controller 710, routers 720, and network radio nodes 730. Wireless network 1400 also includes an access point (AP) 1410. The HetNet provides unified treatment of LTE network radio nodes, i.e., eNBs, and WiFi network radio nodes, i.e., APs. eNBs and APs can be implemented in a single box, or in separate boxes. The HetNet provides per-flow policy to determine which air interface technology to use, for example, selecting an LTE air interface or a WiFi air interface.

Figure 15:
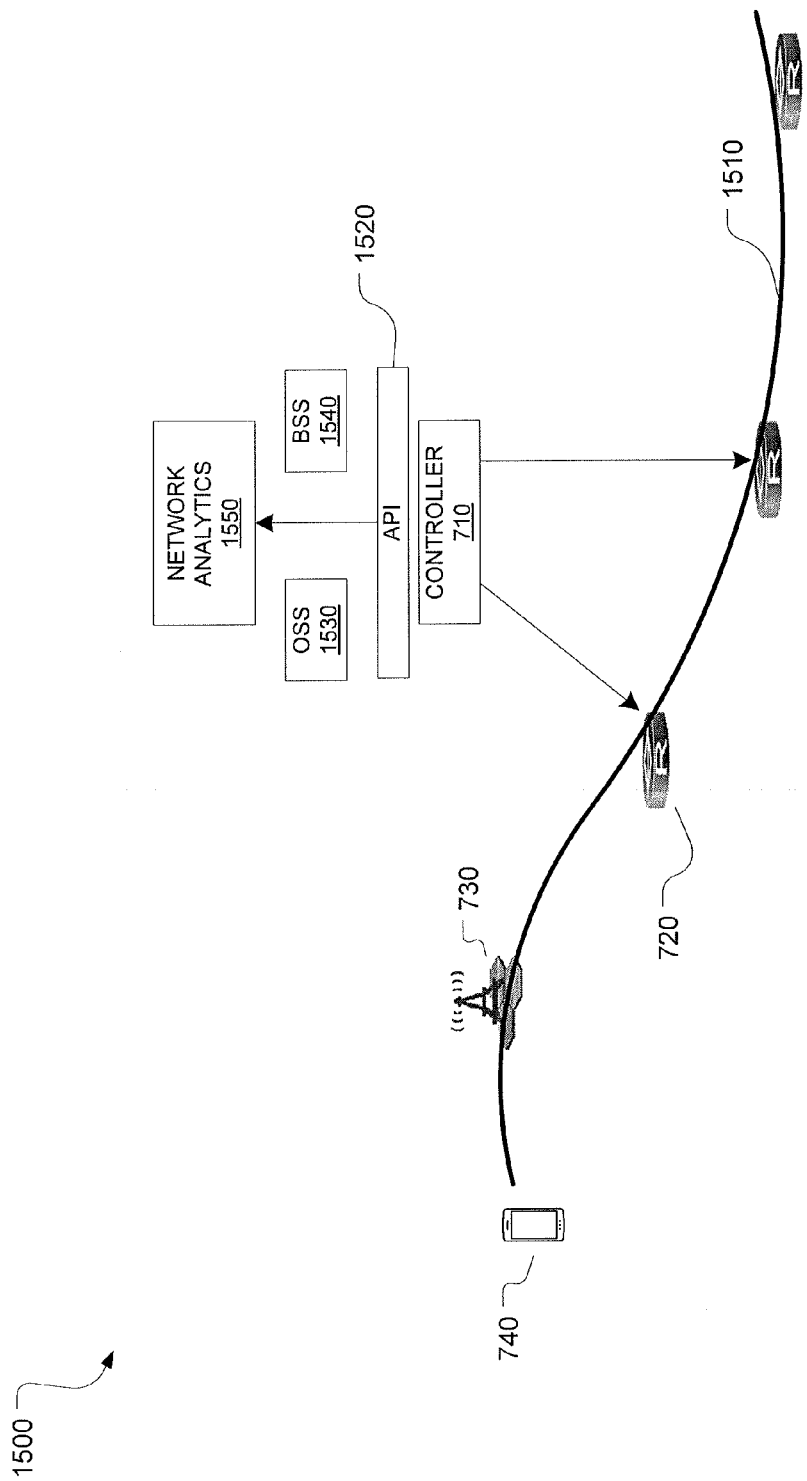
FIG. 15 is an illustration of a business/operations support system for a wireless network.

FIG. 15 is an illustration of a business/operations support system for a wireless network 1500. Wireless network 1500 includes controller 710, routers 720, and network radio nodes 730. To support various business and operations, controller 710 communicates, through an application programming interface (API) 1520 with a network analytics module 1550, an operations support system (OSS) 1530, and a business support system 1540. Controller 710 is a strategic foothold in an operator's network. Many value-added services can be linked to it. For example, a provisioning system, where error management (EM) protocol is divided among OpenFlow, simple network management protocol (SNMP), and proprietary protocols. Other services include real-time statistics collection and charging.

Figure 16:
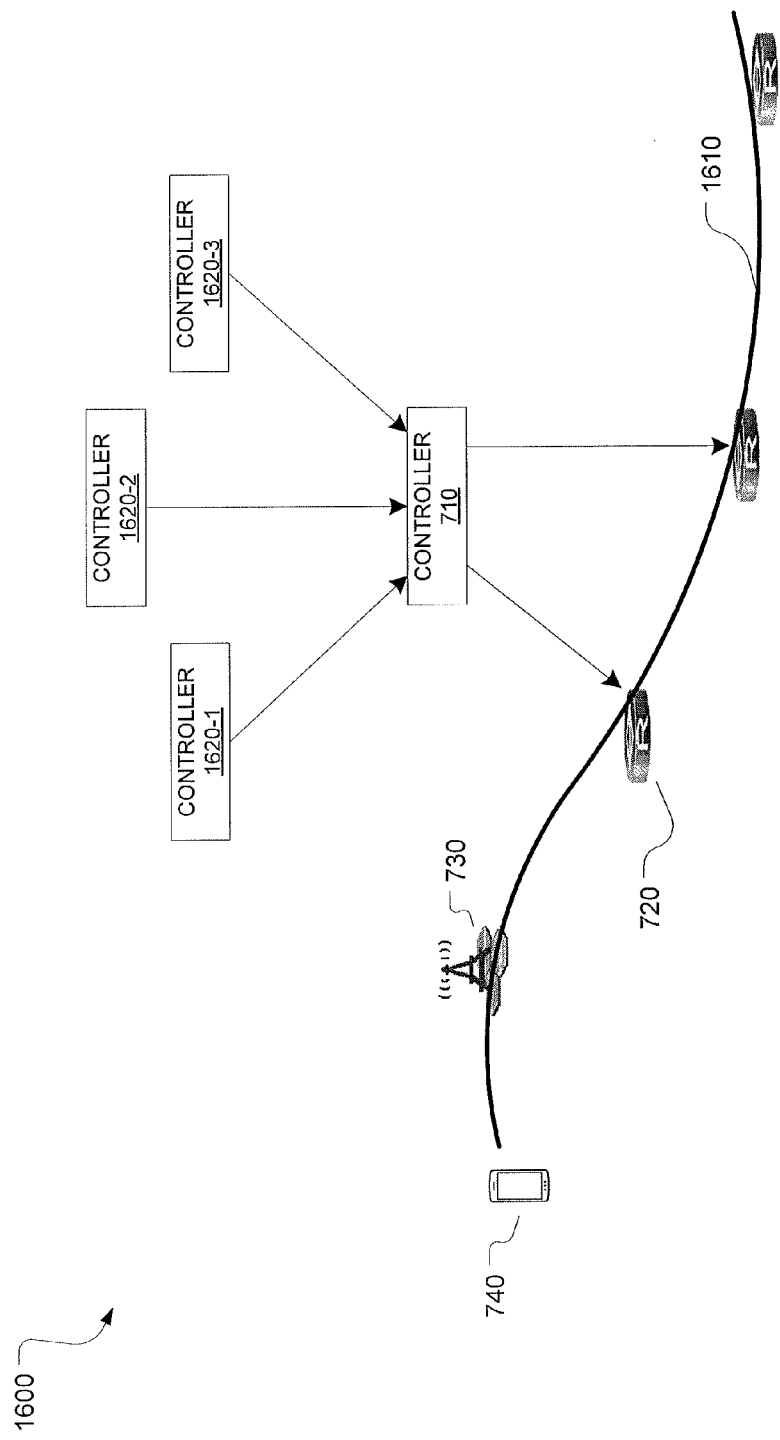
FIG. 16 is an illustration of network sharing for a wireless network.

FIG. 16 is an illustration of network sharing for a wireless network 1600. Wireless network 1600 includes controller 710, routers 720, and network radio nodes 730. Controller 710 includes a FlowVisor controller that provides for network virtualization. Individual retail partners can then obtain a portion of the network via partner controllers 1620-1, 1620-2, and 1620-3.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of routing network traffic, comprising:
configuring flow tables of a virtual switch using a packet processing control protocol, wherein the virtual switch is disposed at a network radio node;
receiving network traffic destined for a user equipment (UE) at the virtual switch;
establishing, by a packet data convergence protocol (PDCP) layer, a data radio bearer (DRB) for the network traffic between a virtual port on the virtual switch and the UE; and
routing the network traffic over the DRB from the virtual port, through the PDCP layer, toward the UE according to the flow tables;
wherein the configuring comprises:
generating, at a controller, at least one flow-entry associated with an action for processing the network traffic;
sending the at least one flow-entry to the virtual switch according to the packet processing control protocol; and
updating the flow tables to include the at least one flow-entry and the action associated therewith.

2. The method of claim 1, wherein the controller is disposed at the network radio node.

3. The method of claim 1, wherein the controller is remotely disposed at a central software defined network (SDN) controller that is logically decoupled from the network radio node.

4. The method of claim 1, wherein generating comprises establishing a data path for the network traffic according to a routing policy.

5. The method of claim 4, wherein generating further comprises establishing the routing policy according to a radio resource control (RRC) protocol.

6. The method of claim 1, wherein generating comprises generating the at least one flow-entry according to a traffic type associated with the network traffic.

7. The method of claim 6, wherein the traffic type is internet protocol (IP) multimedia core network subsystem (IMS), and wherein the action associated with the at least one flow-entry includes routing the network traffic to a low-latency operator network.

8. The method of claim 1, wherein generating is carried out according to a quality of service (QoS) requirement for the network traffic.

9. The method of claim 1, wherein the action associated with the at least one flow-entry includes selecting an air interface.

10. The method of claim 1, further comprising receiving, at the PDCP layer, an instruction for the establishing the DRB from a controller, wherein the instruction is transmitted by the controller according to the packet processing control protocol.

11. The method of claim 1, further comprising: re-configuring the flow tables using the packet processing control protocol; and re-routing the network traffic according to the flow tables after the re-configuring.

12. The method of claim 11, wherein re-configuring comprises replacing at least one flow-entry in the flow tables with a new flow-entry, and wherein the new flow-entry is generated upon the UE's moving to be served by another network radio node.

13. A network radio node comprising:
a switch configured to receive network traffic destined for an user equipment (UE) from a router and having: a secure channel over which a flow-entry and an associated action are received according to a packet processing control protocol, wherein the secure channel is coupled to a controller configured to generate the flow-entry according to a routing policy; and flow tables configured to store the flow-entry; and
a packet data convergence protocol (PDCP) module configured to:
receive an initialization instruction, and establish a data radio bearer (DRB) between a virtual port on the switch and the UE according to the initialization instruction, wherein the switch is further configured to route the network traffic over the DRB according to the flow-entry and the associated action.

14. The network radio node of claim 13, further comprising a mobility management controller containing the controller.

15. The network radio node of claim 13, wherein the controller is remotely disposed at a central software defined network (SDN) controller.

16. The network radio node of claim 15, wherein the central SDN controller comprises a radio resource control (RRC) module configured to generate the initialization instruction, and wherein the central SDN controller is further configured to transmit the initialization instruction according to the packet processing control protocol.

17. The network radio node of claim 16, further comprising a radio link control (RLC) module coupled to the PDCP module and configured to: initialize according to the initialization instruction; and process the network traffic received from the PDCP module over the DRB.

18. The network radio node of claim 17, further comprising: a media access control (MAC) module coupled to the RLC module and configured to process the network traffic received from the RLC module over the DRB; and a physical layer (PHY) module coupled to the MAC module and configured to process the network traffic received from the MAC module over the DRB and transmit the network traffic to the UE over the DRB.

19. A communication system comprising: a first central software defined network (SDN) controller having a radio resource control (RRC) module; a first network radio node configurable by the RRC module according to a routing policy and configured to serve an user equipment (UE); and a plurality of routers, within a domain of the first central SDN controller, configurable by the first central SDN controller according to a packet processing control protocol and the muting policy, and configured to route network traffic destined for the UE to the first network radio node, wherein the first network radio node comprises: a switch configured to receive network traffic from the plurality of routers and having: a secure channel over which a flow-entry and an associated action are received according to the packet processing control protocol, and flow tables configured to store the flow-entry, wherein the secure channel is coupled to a controller configured to generate the flow-entry according to a routing policy; and a packet data convergence protocol (PDCP) module configured to: receive an initialization instruction from the RRC module according to the packet processing control protocol, and establish a data radio bearer (DRB) between a virtual port on the switch and the UE according to the initialization instruction, wherein the switch is further configured to route the network traffic over the DRB according to the flow-entry and the associated action.

20. The communication system of claim 19, wherein the first network radio node further comprises a radio link control (RLC) module coupled to the PDCP module and configured to: initialize according to the initialization instruction; and process the network traffic received from the PDCP module over the DRB.

21. The communication system of claim 20, wherein the first network radio node further comprises: a media access control (MAC) module coupled to the RLC module and configured to process the network traffic received from the RLC module over the DRB; and a physical layer (PHY) module coupled to the MAC module and configured to process the network traffic received from the MAC module over the DRB and transmit the network traffic to the UE over the DRB.

22. The communication system of claim 19, further comprising a second network radio node configured to serve the UE when the UE moves from the first network radio node to the second network radio node, and wherein the first central SDN controller is further configured to install states, according to the packet processing control protocol, at the plurality of routers and the first network radio node for re-routing the network traffic to the second network radio node.

23. The communication system of claim 22, wherein re-routing the network traffic is carried out according to a quality of service (QoS) requirement for the network traffic.

24. The communication system of claim 19, further comprising a second central SDN controller configured to serve the UE when the UE moves from the first central SDN controller to the second central SDN controller, wherein the second central SDN controller is configured to: notify the first central SDN controller the UE has moved, install a de-tunneling state at a second designated router in a domain of the second central SDN controller, send a router advertisement message to the UE; and wherein the first central SDN controller is configured to: install a forwarding state in the plurality of routers that designates a first designated router in the domain of the first SDN controller upon notification of the UE moving from the second central SDN controller, and install a tunneling state at the first designated router, wherein a tunnel between the first designated router and the second designated router is formed.

25. The communication system of claim 19, wherein the first central SDN controller is further configured to configure, according to the packet processing control protocol, a router of the plurality of routers to duplicate the network traffic for interception.

26. The communication system of claim 19, wherein the first central SDN controller is further configured to install a firewall at one of the plurality of routers.

27. The communication system of claim 19, wherein the first central SDN controller is further configured to communicate with a support system through an application programming interface (API) to provide a value added service.

28. The communication system of claim 27, wherein the value added service includes real-time statistics collection.

29. The communication system of claim 19, wherein the first central SDN controller includes a FlowVisor configured to share control of the first network radio node and the plurality of routers with at least one retail partner controller according to the packet processing control protocol.

* * * * *

UNITED STATES PATENT AND TRADEMARK OFFICE
CERTIFICATE OF CORRECTION

| | | |
|---|---|---|
| PATENT NO. | : 9,578,593 B2 | Page 1 of 1 |
| APPLICATION NO. | : 14/302106 | |
| DATED | : February 21, 2017 | |
| INVENTOR(S) | : Peter J. McCann | |

It is certified that error appears in the above-identified patent and that said Letters Patent is hereby corrected as shown below:

In the Claims

In Column 13, Line 9, Claim 19, delete "muting" and insert --routing--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*